US012551397B1

(12) United States Patent
Parmele et al.

(10) Patent No.: US 12,551,397 B1
(45) Date of Patent: Feb. 17, 2026

(54) MASSAGE ROLLER SYSTEM AND METHOD OF USE

(71) Applicants: Katerina Parmele, Edgewater, MD (US); Dean W Kennedy, Edgewater, MD (US)

(72) Inventors: Katerina Parmele, Edgewater, MD (US); Dean W Kennedy, Edgewater, MD (US)

( * ) Notice: Subject to any disclaimer, the term of this patent is extended or adjusted under 35 U.S.C. 154(b) by 711 days.

(21) Appl. No.: 17/954,186

(22) Filed: Sep. 27, 2022

Related U.S. Application Data

(60) Provisional application No. 63/304,140, filed on Jan. 28, 2022.

(51) Int. Cl.
*A61H 15/00* (2006.01)

(52) U.S. Cl.
CPC . *A61H 15/0092* (2013.01); *A61H 2015/0021* (2013.01); *A61H 2201/1284* (2013.01)

(58) Field of Classification Search
CPC ................ A61H 15/00; A61H 15/0092; A61H 2015/0007; A61H 2015/0014; A61H 2015/0021; A61H 2015/0025; A61H 2015/0035; A61H 2201/1284; A61H 2201/0107; A61H 2201/0126; A61H 2201/0161; A63B 71/0036; B65D 51/28; B65D 45/16
See application file for complete search history.

(56) References Cited

U.S. PATENT DOCUMENTS

| | | | | |
|---|---|---|---|---|
| 4,832,006 A * | 5/1989 | Kirsch | A61H 15/00 601/122 |
| 9,649,246 B1 * | 5/2017 | Johnson | F16B 7/10 |
| 10,925,802 B2 * | 2/2021 | Matossian | A61H 15/0092 |
| 2013/0030332 A1 * | 1/2013 | Ingrassia | A61H 7/002 601/19 |
| 2013/0231228 A1 * | 9/2013 | Wyatt | A63B 21/0442 482/130 |
| 2017/0020771 A1 * | 1/2017 | Shannon | A61H 15/00 |
| 2017/0231862 A1 * | 8/2017 | Olschansky | A61H 15/0092 601/128 |
| 2021/0085555 A1 * | 3/2021 | Davis | A61H 23/00 |
| 2022/0096314 A1 * | 3/2022 | Nagy | A61H 15/00 |

FOREIGN PATENT DOCUMENTS

| | | | |
|---|---|---|---|
| DE | 202016001648 U1 * | 7/2016 | A61H 15/0078 |

* cited by examiner

*Primary Examiner* — Colin W Stuart
*Assistant Examiner* — Douglas Y Sul
(74) *Attorney, Agent, or Firm* — AVEK IP, LLC

(57) ABSTRACT

A therapeutic massage roller system includes a shaft extending from a first end to a second end, the shaft acting as an axle; wheels, each of the wheels including a channel to engage with the shaft and an exterior contact surface, the wheels including at least a first size and a second size; the shaft receives a user selection of the wheels to create a custom arrangement of one or more of the wheels.

16 Claims, 17 Drawing Sheets

MASSAGE ROLLER SYSTEM AND METHOD OF USE

BACKGROUND

1. Field of the Invention

The present invention relates generally to therapeutic massage systems, and more specifically, to a user-reconfigurable roller wheel and support assemblies which are adaptable for various methods of use on the body.

2. Description of Related Art

Massage roller systems are well known in the art and are effective means to provide pain relief and improved comfort for a user. Massage rollers are therapeutic devices that act on muscles and fascia to enable release of adhesions and reduce inflammation and pain. Currently, the rollers on the market are mostly specialized to act on particular and very specific muscle groups. Therefore, in order to be able to access all the different muscle groups of the body, a user would need to purchase multiple specialized rollers.

Conventional massage rollers vary, and one example is shown in FIG. 1, in which the massage roller 101 includes a foam body 103 that is generic in form. A user will roll a part of their body along the foam body 103 to experience the benefits discussed above.

The drawbacks of conventional massage rollers are those discussed above. In addition, conventional rollers do not allow the user to work properly around an individual's bony prominences and are not adaptable or customizable to work with different body sizes.

For example, a user lying on a substantially cylindrical roller when massaging and rolling the back engages or encounters the protrusion of the spinous processes of the thoracic and lumbar spine, and painful or awkward engagement of an ill-fitting roller surface hinders access to the paraspinal muscles.

Many of the prior art devices may work adequately for some people but not others, since a person with a smaller frame would require rollers or other pressure applying surfaces with a different geometry than a person with a larger frame.

There is an unmet need, therefore for a user-configurable massage pressure applying structure or system which allows a therapist or user to access all the different muscle groups of differently sized persons in an economical and practical unit.

Accordingly, although great strides have been made in the area of massage roller systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
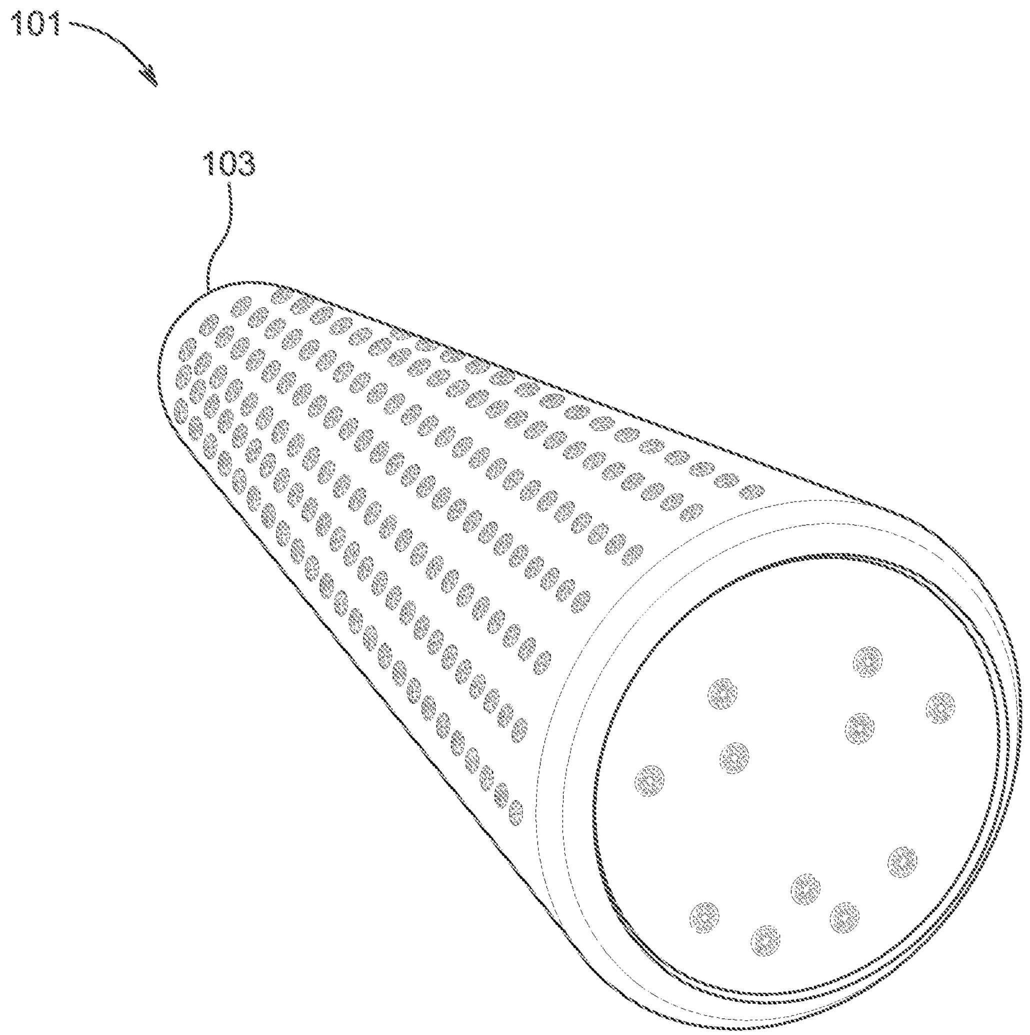
FIG. 1 (Prior Art)
FIG. 1 is a front isometric view of a common massage roller system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional therapeutic massage roller systems. Specifically, the present invention provides a convenient, flexible, inexpensive, and practical modular therapeutic massage roller system which is readily customizable or user-reconfigurable to allow the user to practice a method for selectively applying focused pressure to act on muscles and fascia in the user's body, all configured in a transportable massage therapy kit which includes multiple roller members (wheels) configurable to fit rotatably on a shaft, which is optionally supportable on a cradle support member configured to provide support from the ground or another stable surface. The present invention can also be provided for use with one or more handles or in a wall mounted configuration. These and other unique features of the system and method of use are discussed below and illustrated in the accompanying drawings.

The applicant, after evaluating the massage roller products offered, found that a person with a smaller frame would require smaller spacing between separable rollers than a person with a larger frame. Other similar examples for body parts that would benefit from customizability of roller wheel spacers include the cervical spine and the anterior tibia. The advantage of using a multi roller system on a cradle support member is that the roller assembly remains in a fixed position and only the body is moving, allowing more defined pressure to be applied to the focused muscle group. The system and method of the present invention act as an all-inclusive, modular roller system which allows interchangeability of selected parts to provide access all the different muscle groups of differently sized persons in one compact, self-contained unit. The kit provides, in addition, shaft supporting and steering handles which can be used separately from the cradle member, thus allowing a selected array of roller members to be aligned upon and supported by the shaft member so that the handheld customized roller array can be used as a handheld device, adding to the customizability and usefulness of the product.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2A:
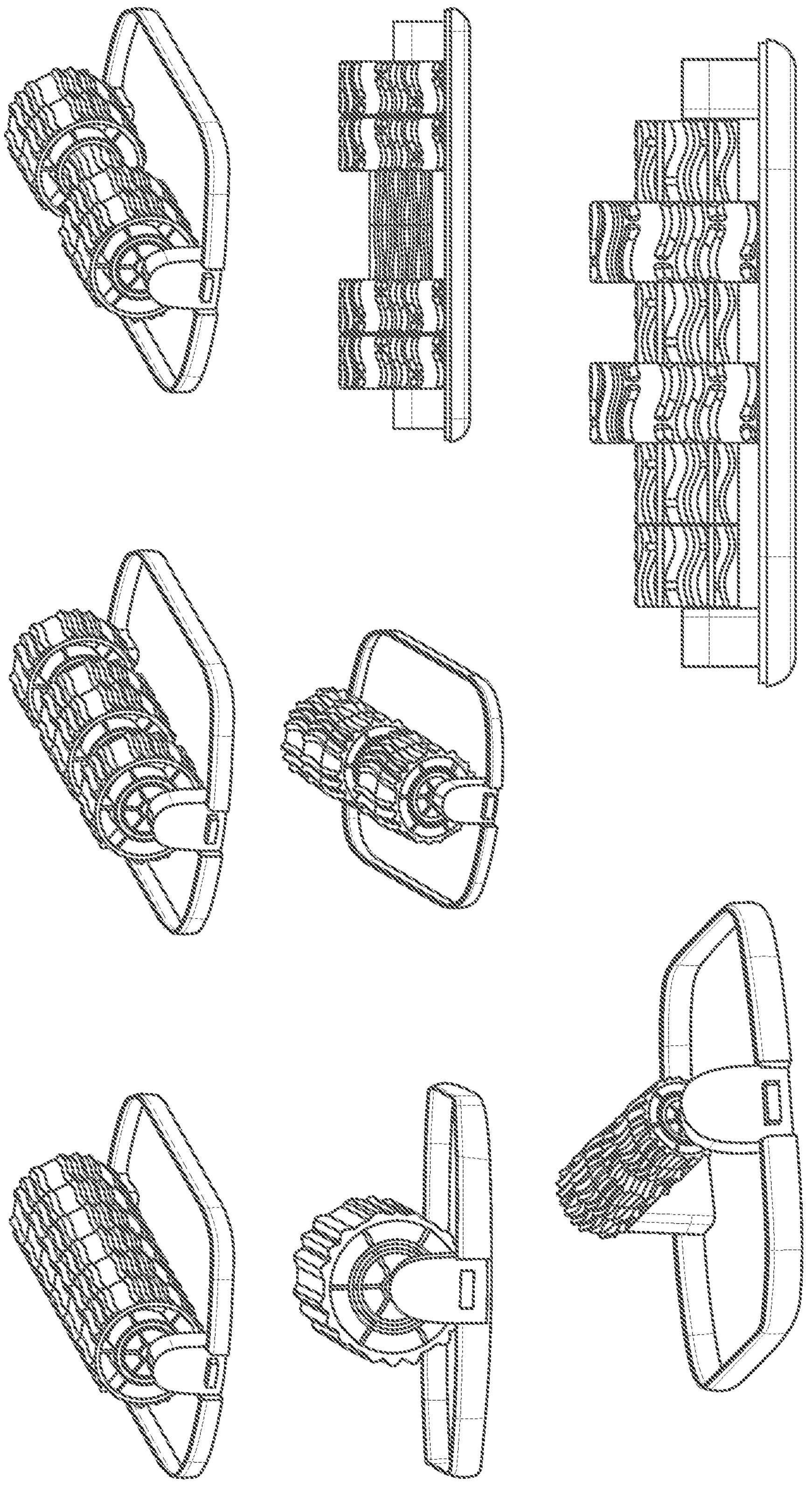
FIG. 2A is a plurality of assemblies of a therapeutic massage roller system in accordance with the present invention.

Referring now to the drawings wherein like reference characters identify corresponding or similar elements throughout the several views, FIG. 2A depicts a plurality of configurations of a therapeutic massage roller system in accordance with the present invention. As shown, the massage roller system can be configured with various sizes of wheels, as will be discussed in greater detail below, wherein the user can configure the system as needed, such as with all large wheels, all small wheels, or any combination.

Figure 2B:
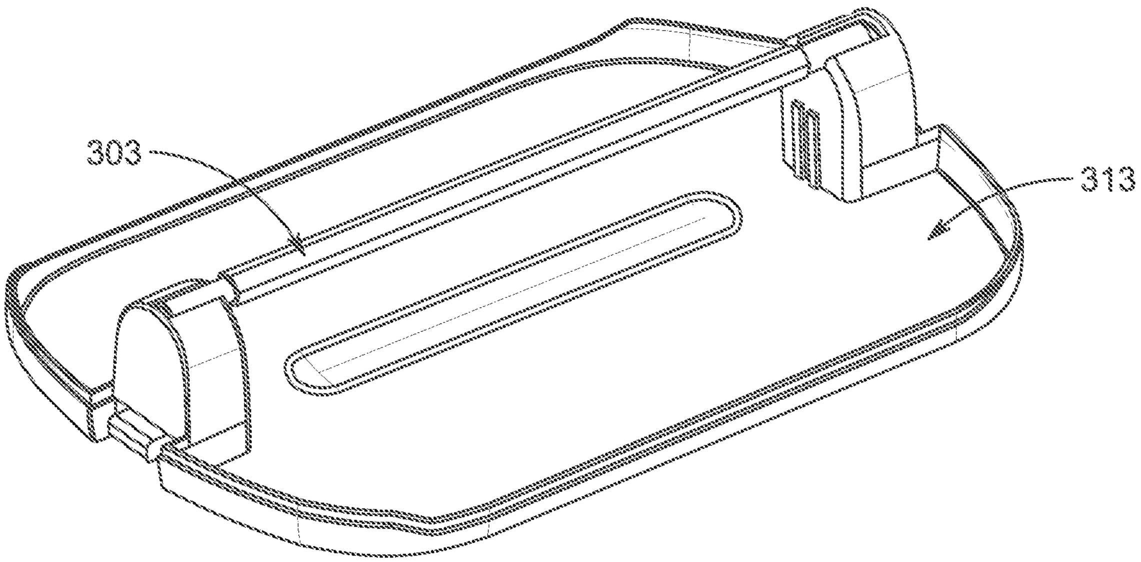
FIG. 2B is an isometric view of the base and shaft of the system of the present invention prior to the addition of a plurality of wheels.

In FIG. 2B, a shaft 303 is shown connected to a base 313 prior to the addition of one or more of a plurality of wheels, as will be discussed herein.

Figure 3:
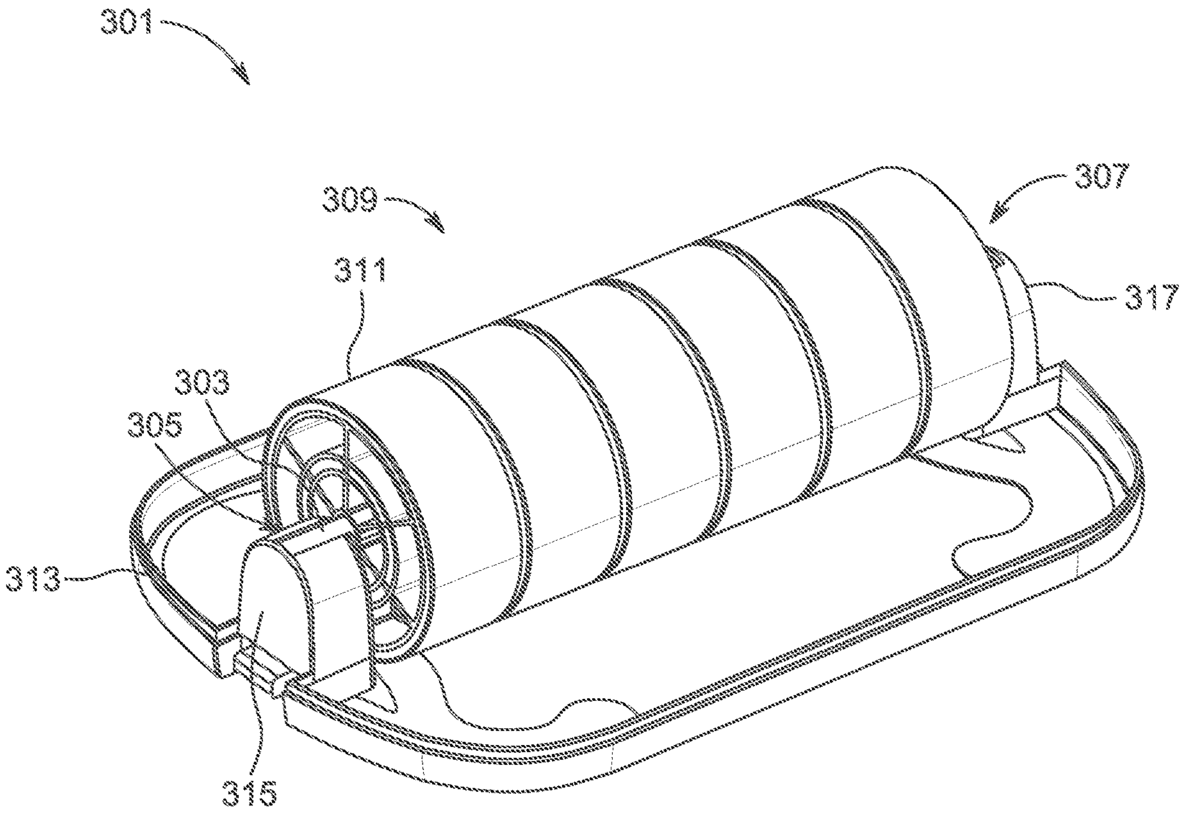
FIG. 3 is an isometric view of a therapeutic massage roller system with large wheels in accordance with the present invention.

In FIG. 3, a therapeutic massage roller system 301 is shown. System 301 includes a shaft 303 extending from a first end 305 to a second end 307, the shaft acting as an axle to receive a user selection of a plurality of wheels 309, each of the plurality of wheels including a channel to engage with the shaft and an exterior contact surface 311, the plurality of wheels including at least a first size and a second size as will be discussed in greater detail herein. As shown, the shaft 303 receives the user selection of the plurality of wheels to create a custom arrangement of one or more of the plurality of wheels.

Figure 4:
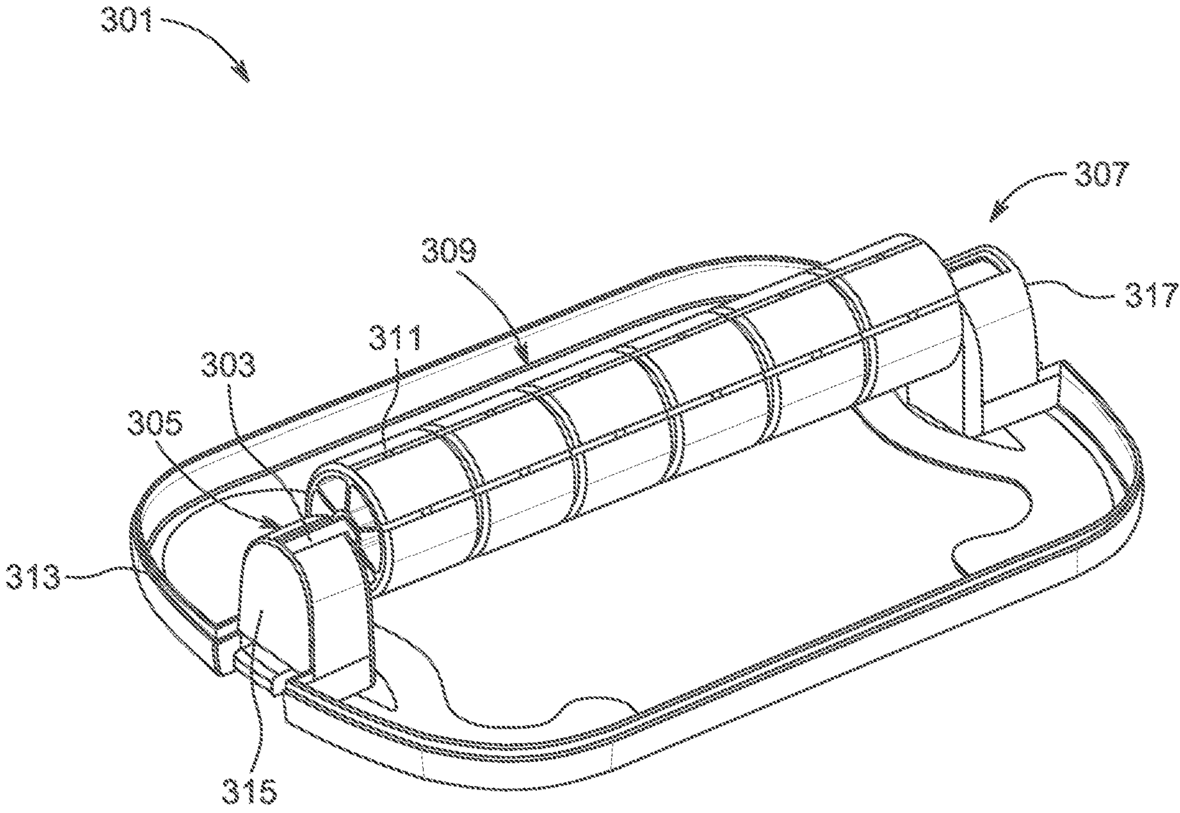
FIG. 4 is an isometric view of a therapeutic massage roller system with small wheels in accordance with the present invention.

In FIG. 3, a first arrangement is shown, wherein only large wheels are used. Further, in FIG. 4, an alternative arrangement is shown, wherein only small wheels are used.

System 301 further includes a base 313 extending from a first side end to a second side end and from a top end to a bottom end, the base having a first side support 315 and a second side support 317. As shown, the first end of the shaft engages with the first side support 315 and the second end of the shaft engages with the second side support 317 to hold the shaft and the plurality of wheels above the base. It should be appreciated that various configurations of supports 315, 317 may be used, however, one contemplated embodiment includes inwardly facing and axially aligned bushing pocket supports that extend upwardly from the base.

Figure 5:
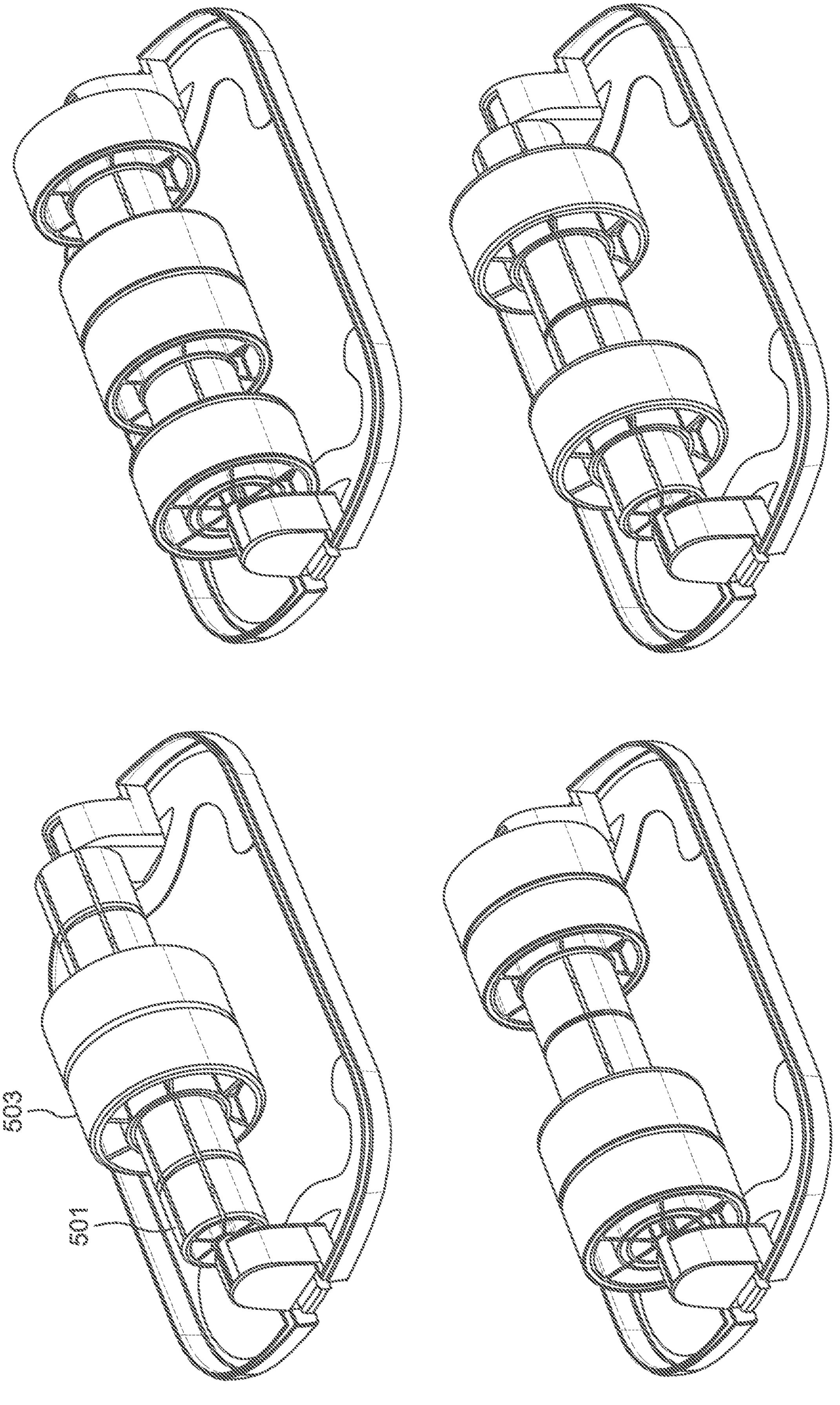
FIG. 5 shows a plurality of isometric views of various configurations of a therapeutic massage roller system with user selected configurations of large and small wheels in accordance with the present invention.

In FIG. 5, a plurality of assemblies of a therapeutic massage roller system are shown, wherein there are a plurality of user selected wheels, including both large wheels 501 and small wheels 503. It should be appreciated and understood that the contact surface of each of the plurality of wheels can vary, such as having protrusions, grooves, ridges, textures, durometers, tread patterns, or the like, or further including a smooth surface.

Figure 6:
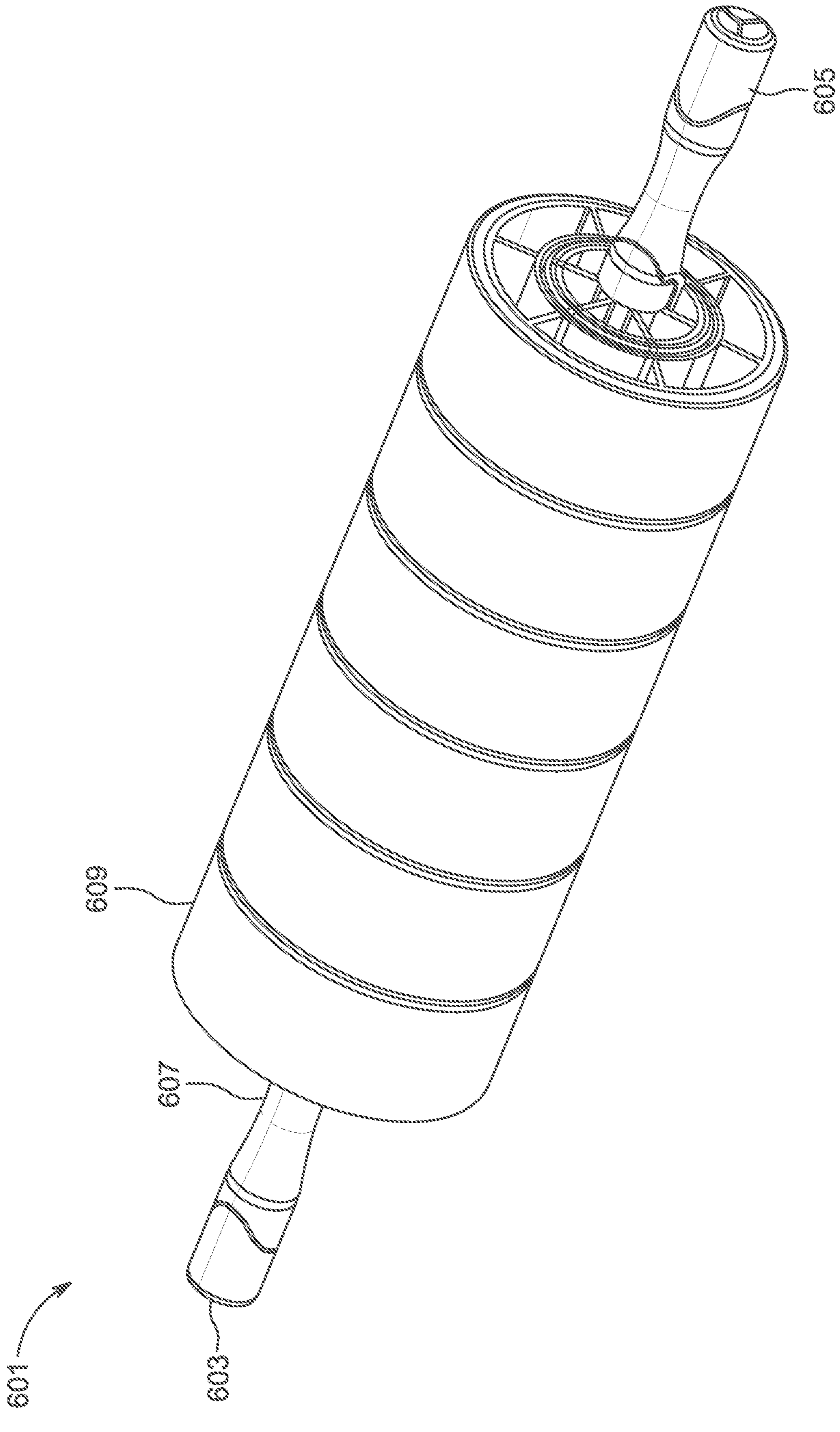
FIG. 6 is an isometric view of a therapeutic massage roller system with handles and large wheels in accordance with the present invention.
Figure 7:
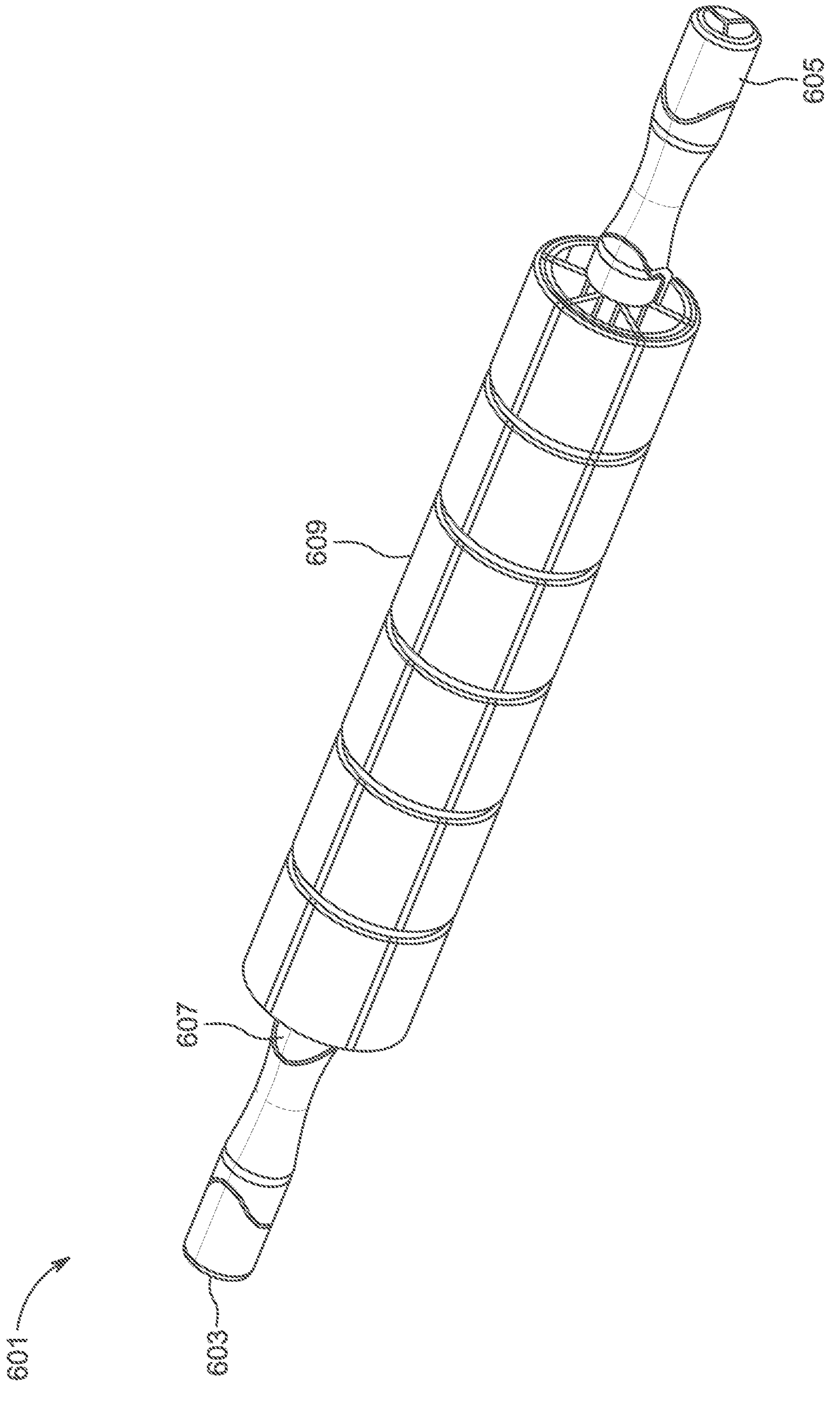
FIG. 7 is an isometric view of a therapeutic massage roller system with handles and small wheels in accordance with the present invention.
Figure 8:
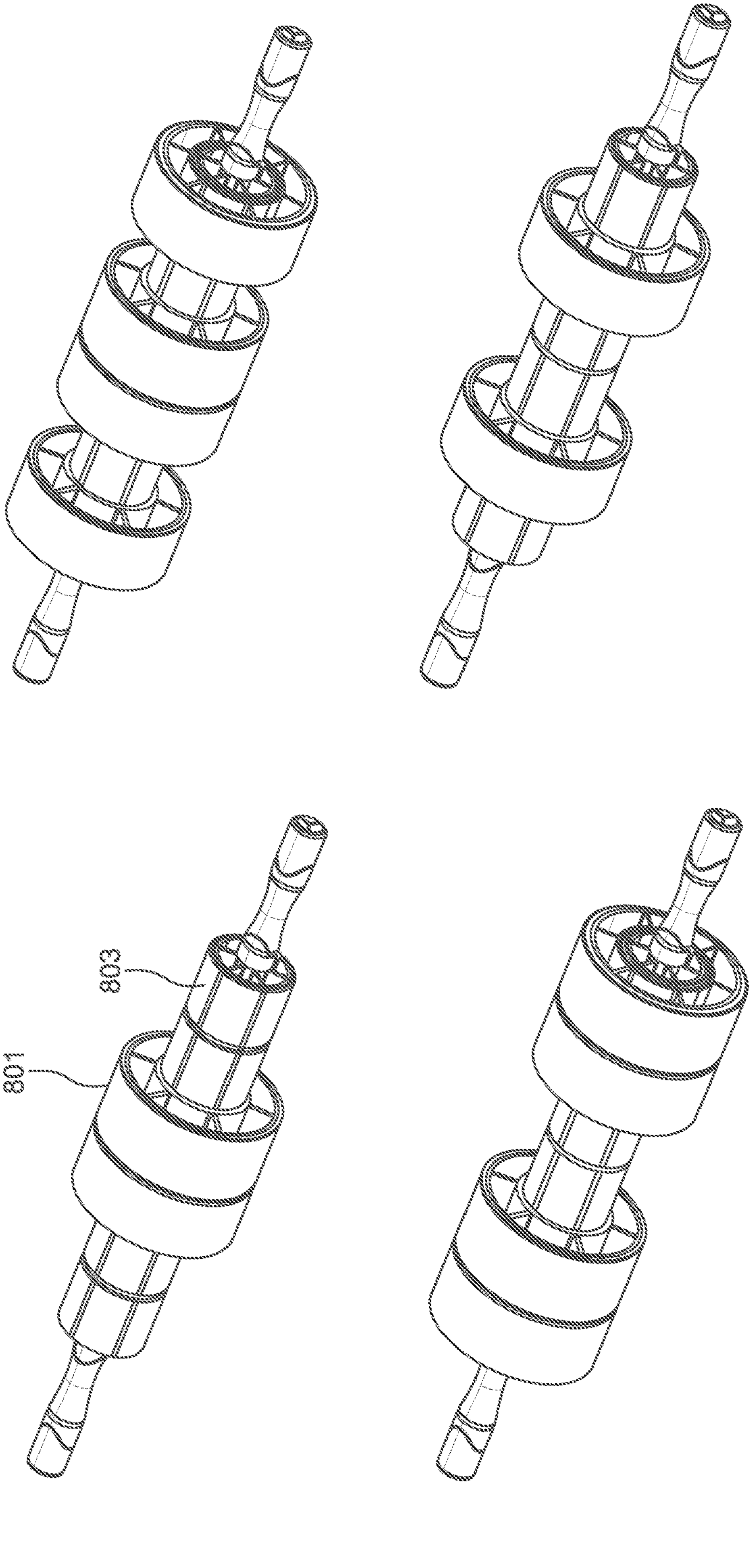
FIG. 8 shows a plurality of isometric views of various configurations of a therapeutic massage roller system with handles and with user selected configurations of large and small wheels in accordance with the present invention.

In FIGS. 6 and 7, an embodiment of a therapeutic massage roller system 601 with handles 603, 605 is shown. System 601 can include the same features discussed above, namely a shaft 607 and a plurality of wheels 609. Again, as shown, the user can select between large 801 and small 803 wheels or a combination thereof (see FIG. 8). It should be appreciated that the handles 603, 605 are removable.

Figure 9:
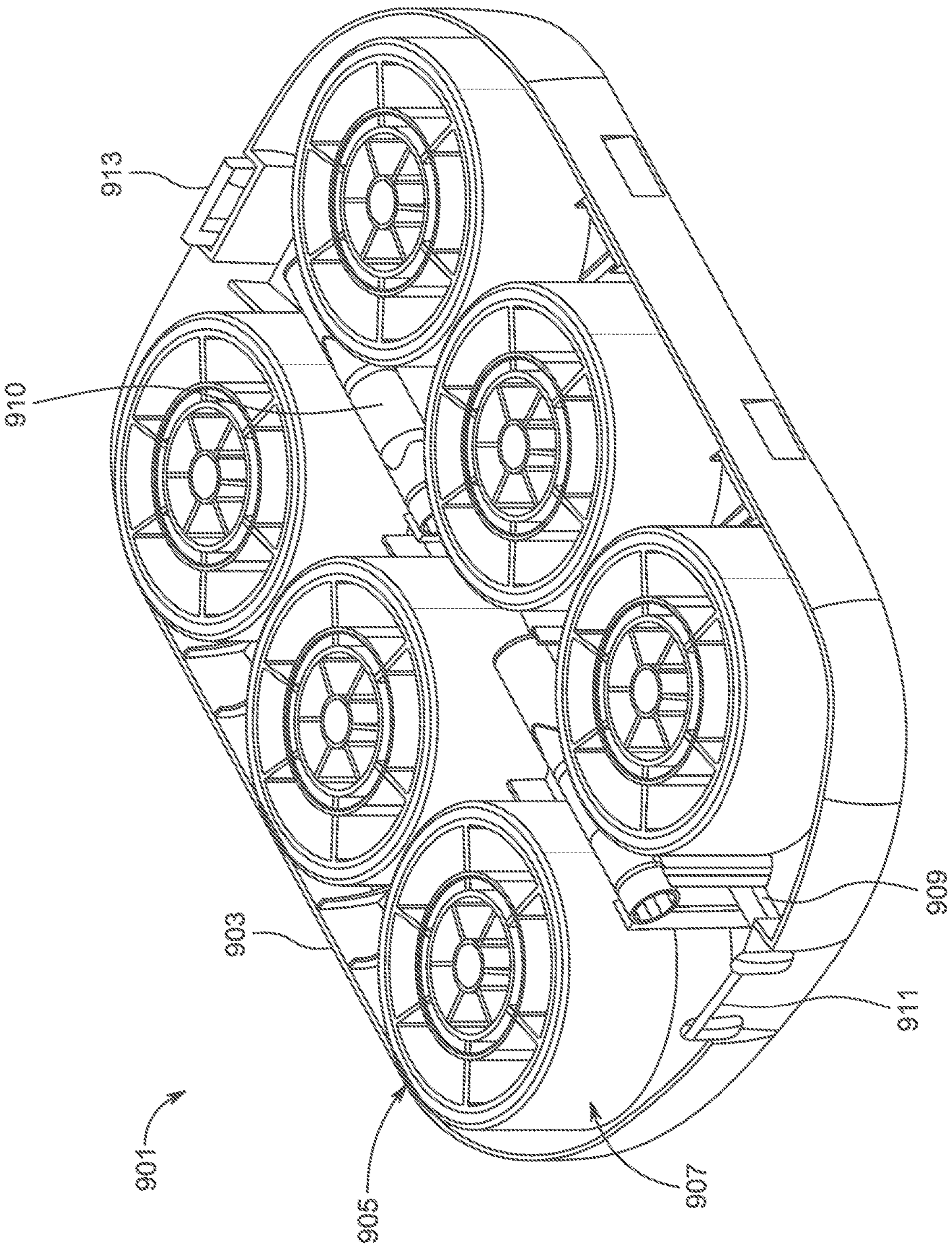
FIG. 9 is a top isometric view of a Cover of the present invention with a plurality of wheels stored therein in accordance with the present invention.
Figure 13A:
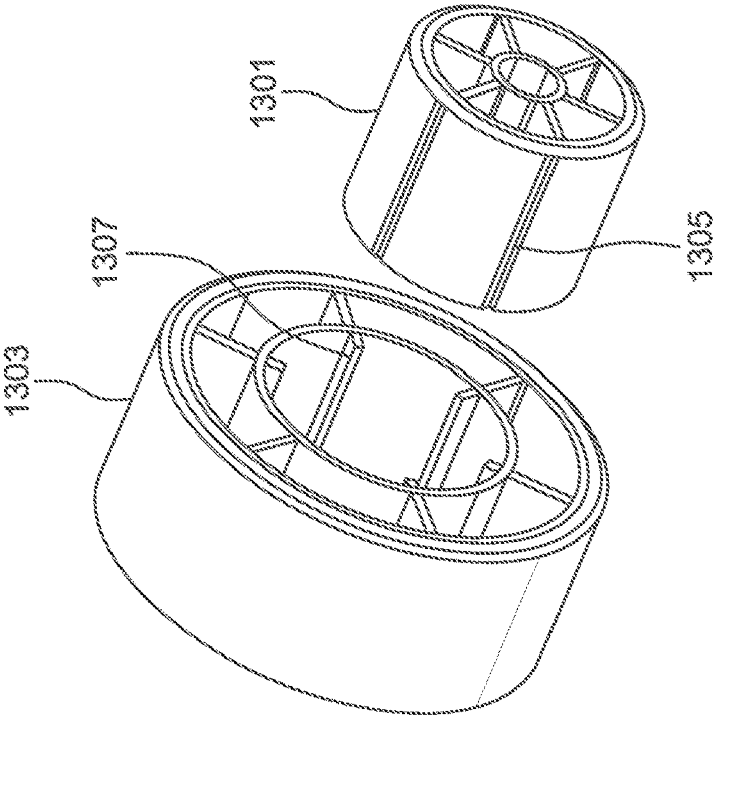
FIGS. 13A and 13B show nesting of the plurality of wheels of the present invention.
Figure 13B:
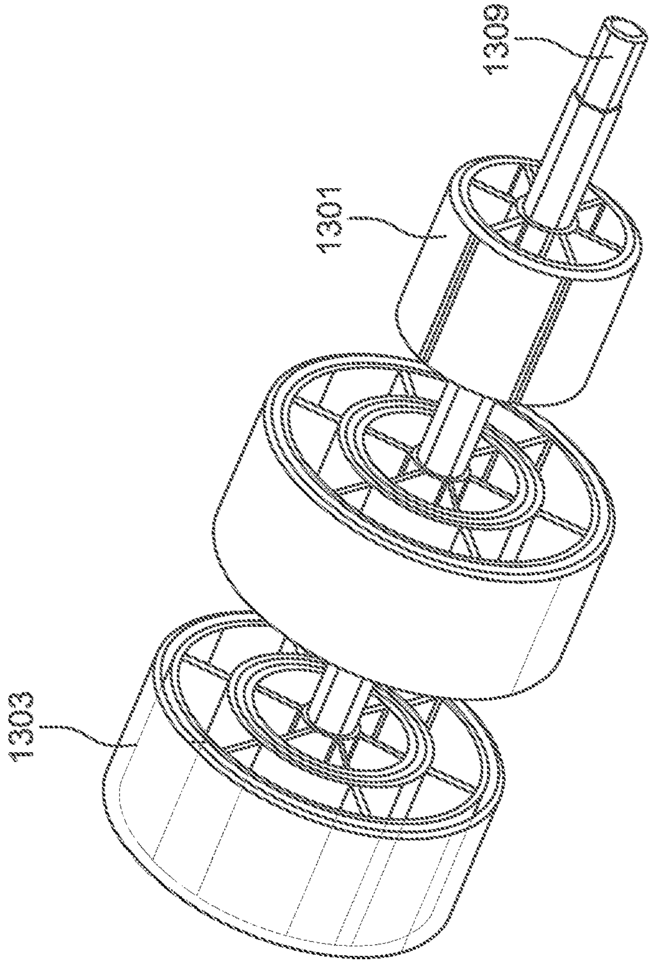
Figure 14:
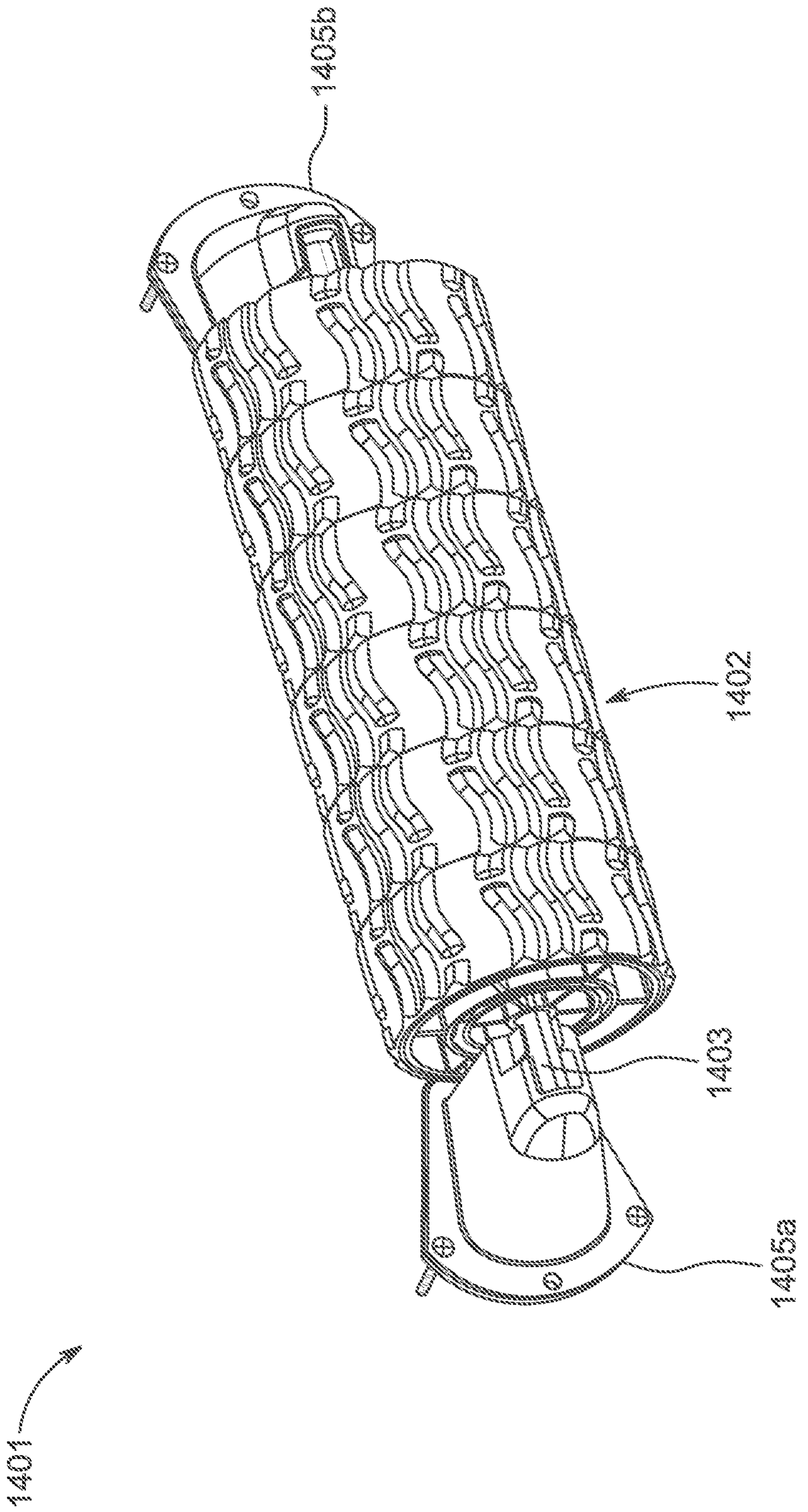
FIG. 14 is an isometric view of a wall mounted therapeutic massage roller system in accordance with the present invention.

In FIG. 9, an open view of a therapeutic massage roller system 901 is shown which provides for a carrying case to receive and support a plurality of independent wheels, which are arranged in sets (ex. 6 sets), each set having a small wheel and a large wheel. System 901 having a cover 903 with one or more sections 905 configured to hold wheels 907. As shown, it should be appreciated that the cover may further hold the shaft 909 and one or more handles 910, and include one or more latches 911, 913 to secure the cover to the base as will be discussed herein, making the system enclosable for transport. As best shown in FIGS. 13A and 13B, the system of the present invention can be configured such that the small wheels 1301 can nest into the large wheels 1303. This can be achieved by having appropriate diameters as would be understood by those skilled in the art, and further by the small wheels 1301 having one or more channels 1305 to engage with one or more ridges 1307 of the large wheels. Referring back to FIG. 9, the nesting feature allows for large wheels 1303 and small wheels 1301 to be nested together within the base.

Figure 10:
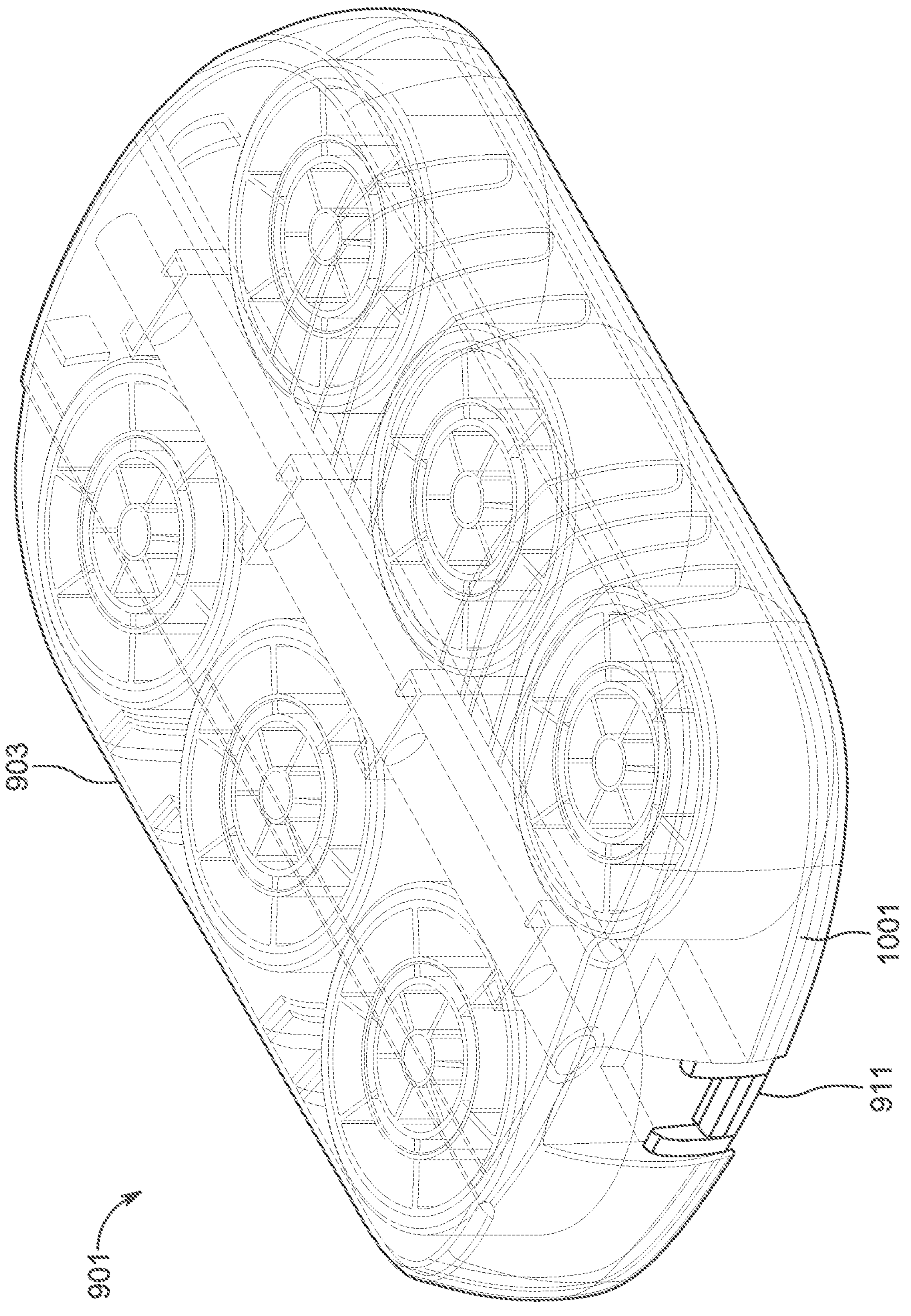
FIG. 10 is a top isometric view of a base with a Cover of the present invention with a plurality of wheels stored therein in accordance with the present invention.
Figure 11:
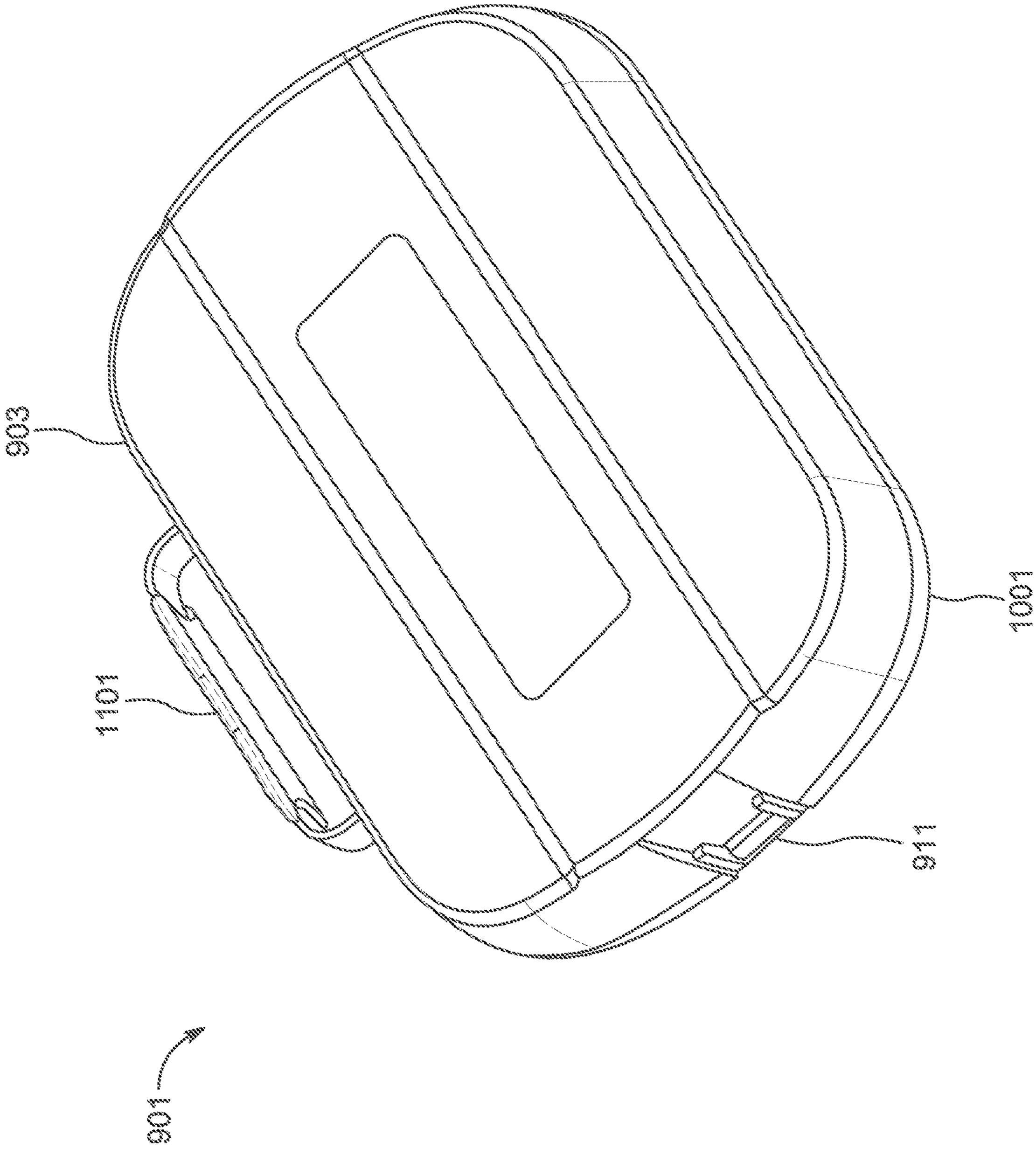
FIG. 11 is a top isometric view of a base with a Cover of the present invention with a plurality of wheels stored therein in accordance with the present invention.
Figure 12:
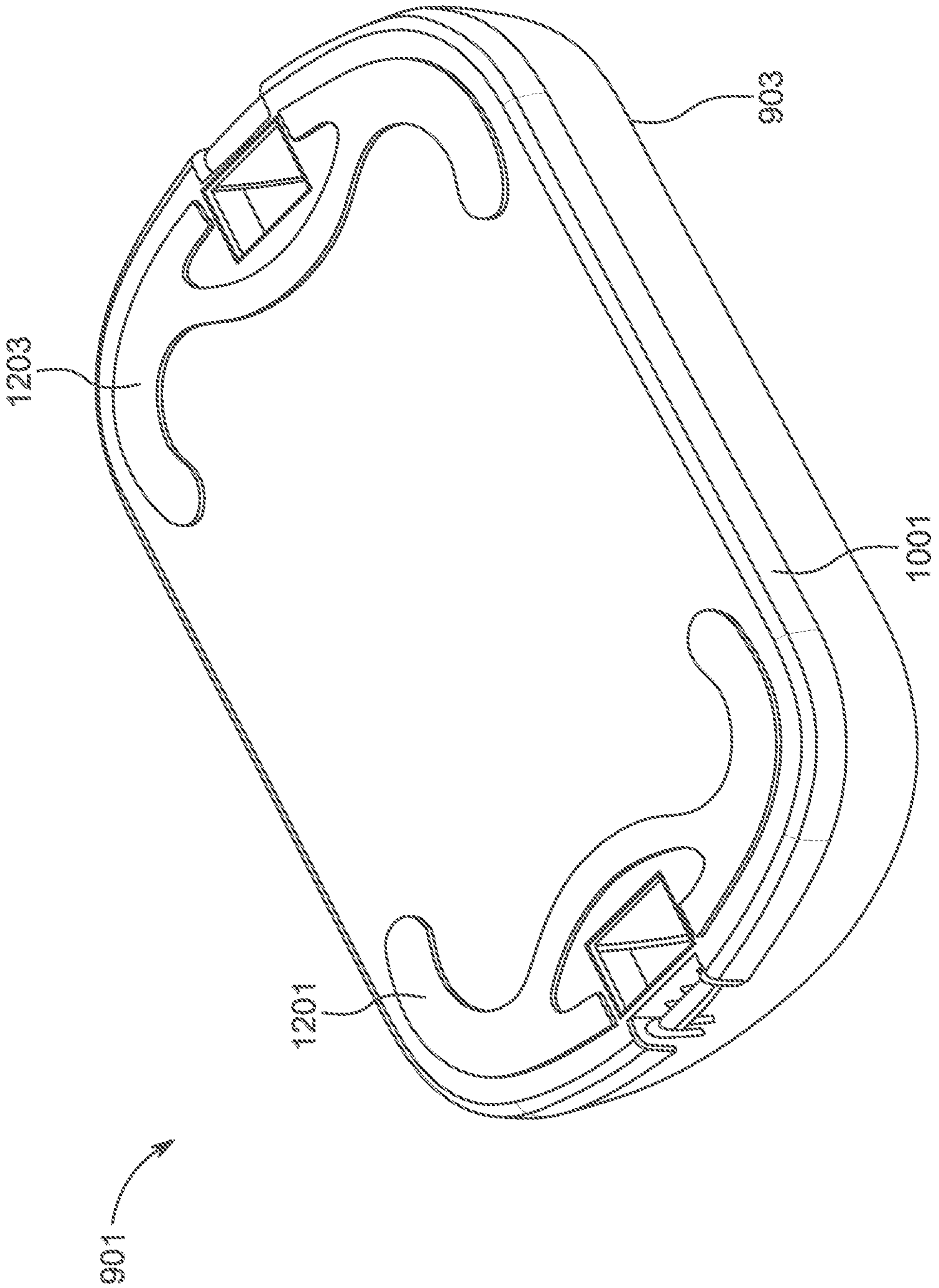
FIG. 12 is a bottom isometric view of a base with a lid of the present invention with a plurality of wheels stored therein in accordance with the present invention.

In FIG. 10, the system 901 is shown, further including a base 1001 secured to cover 903. Thereby enclosing the plurality of wheels. In FIG. 11, the system 901 is shown in the closed configuration, with the wheels contained therein. Further shown is a carrying strap 1101 for easy transport. It should be appreciated that the system can further include one or more anti-skid attachments 1201, 1203 as shown in FIG. 12. This configuration allows for the elements of the therapeutic massage roller system to be easily packed and transported for use at various locations.

Referring again to FIGS. 13A and 13B, the nesting feature of the wheels is shown. As discussed above, the small wheels 1301 can nest within the large wheels 1303, thereby compacting the system to save space. The wheels further can be attached to the shaft 1309 as shown.

It should be appreciated that one of the unique features believed characteristic of the present invention is that the user can completely customize the arrangement of wheels, such as having all large, all small, or any combination thereof. This allows for the system to function for use on various parts of the body, as well as on users of varying sizes. In addition, the system is easily transported, again providing for improved functionality over the prior art.

The modular therapeutic massage roller system and transportable massage therapy kit of the present invention is advantageously configured with sections that are removable, able to be stored in a carry case, and allow for variety in massage roller depth across the whole roller face. The modular therapeutic massage roller system and transportable massage therapy kit of the present invention provides a user-configurable system that allows the user to place the base member on the ground so that the Shaft member can be placed in and supported by upwardly projecting shaft support members which are designed to safely support the weight of a patient or user when in use. When in use, the roller wheel surfaces are fully separated from and shielded from the ground's surface.

In FIGS. 14-15A and 15B, an alternative embodiment of a therapeutic massage roller system 1401 is shown. In this embodiment, a plurality of wheels 1402 are secured to a shaft 1403 which is then secured to a wall mount 1405*a*, 1405*b*. The wall mount 1405*a*, 1405*b* may include two sides, each being configured to secure to a vertical surface via one or more attachment devices, such as screws. This allows for use of the system in a vertical orientation by the user.

Figure 15A:
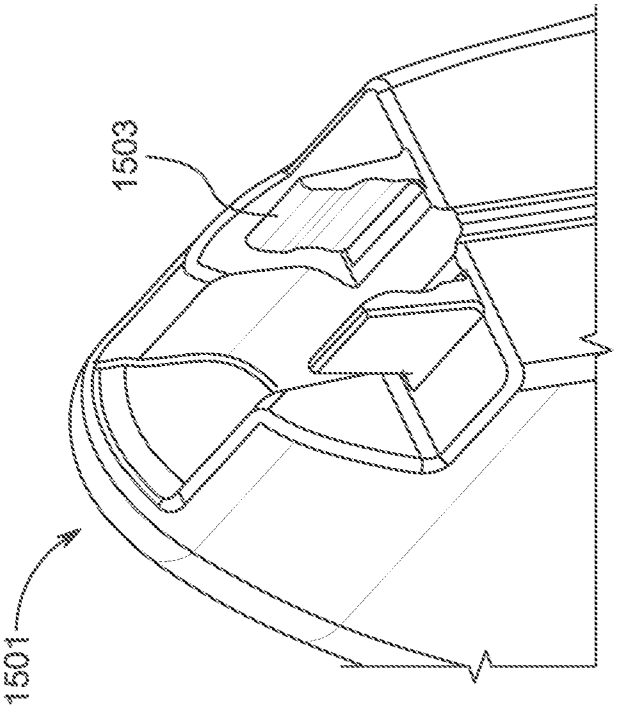
FIGS. 15A and 15B show two configurations for the wall mounted therapeutic massage roller system of FIG. 14.
Figure 15B:
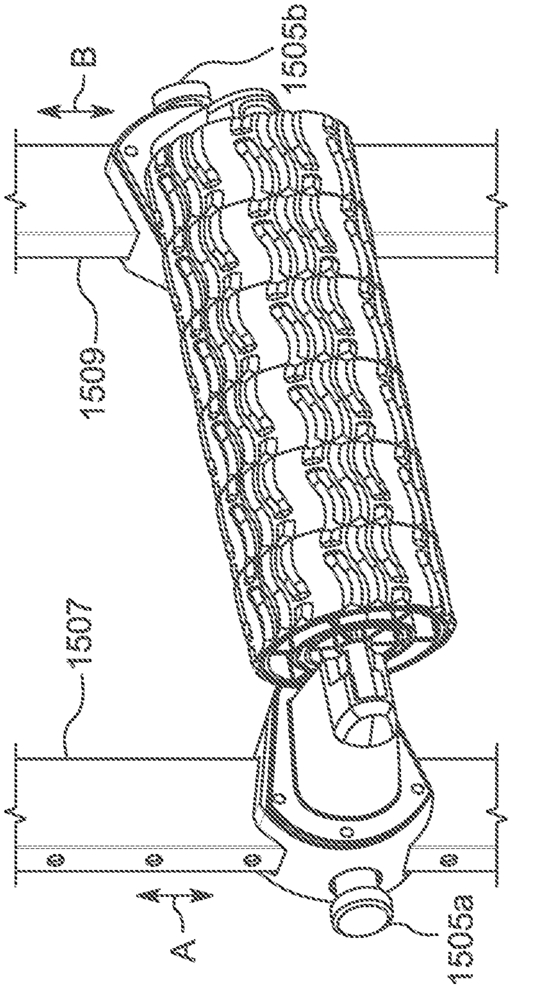

As shown in FIG. 15A, one contemplated mount 1501 includes a quick release attachment 1503 configured to receive the shaft via pressure and hold it therein. In FIG. 15B, a front view shows a contemplated mechanical interlocking device, such as a spring plunger 1505*a*, 1505*b* that can provide for a vertical adjustment (shown with arrows A and B) along one or more rails 1507, 1509.

This allows for the user to adjust the height as desired. It should be appreciated that any of the features of the various embodiments discussed herein can be incorporated to other embodiments through the teachings of this application.

Figure 16:
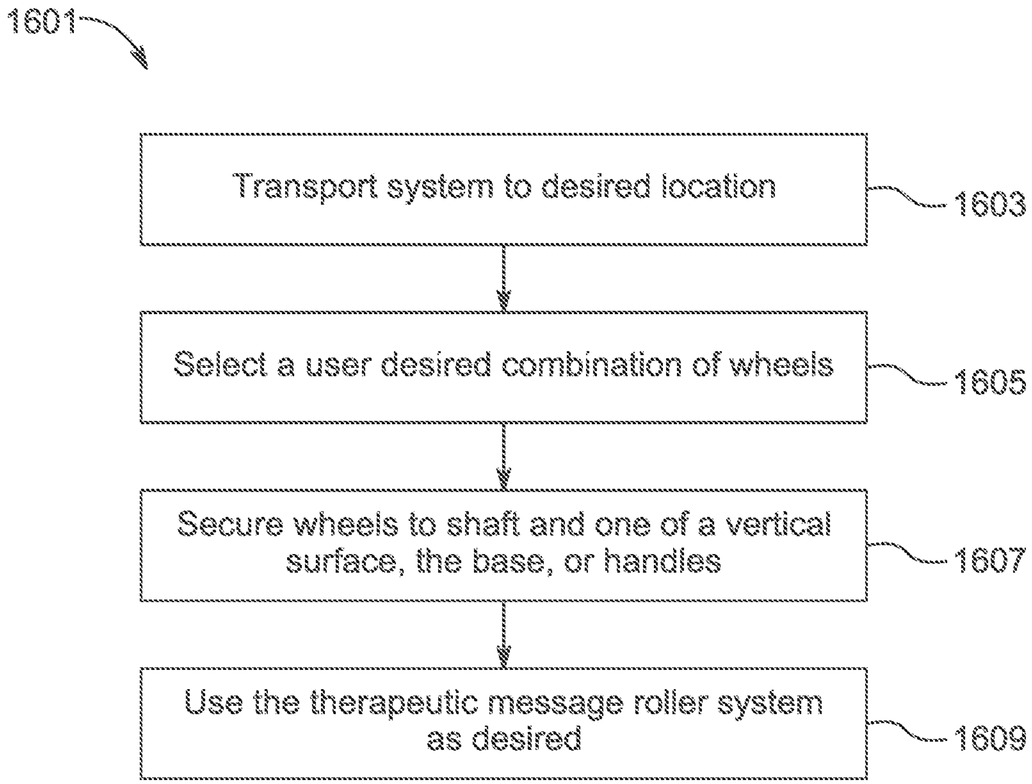
FIG. 16 is a flowchart of a method of use of the therapeutic massage roller system of the present invention.

In FIG. 16, a flowchart 1601 depicts a method of use of the system of the present invention. During use, the user will transport the therapeutic massage roller system to s desired location, which may include their home or elsewhere, as shown with box 1603. The user will make a selection of a combination of wheels, such as all large, all small, or a combination, as shown with box 1605. Then, the user will insert the shaft through the user selection of wheels and then either add handles, secure the shaft to the base, or secure the shaft to a wall mount, as shown with box 1607. The user can then utilize the therapeutic massage roller system as desired, as shown with box 1609.

The system and method of the present invention allows for customization for a body size and part. For example, a person with a smaller frame would require smaller spacing between separable wheels than a person with a larger frame. Other similar examples for body parts that would benefit from customizability of roller wheel spacers include the cervical spine and the anterior tibia. The advantage of using a multi wheel system on a cradle support member (base) is that the shaft with plurality of wheels remains in a fixed position and only the body is moving, allowing more defined pressure to be applied to the focused muscle group. Further, the present invention allows for ergonomic and comfort advantages over the prior art. Specifically, when a user utilizes a conventional roller for rolling out their hamstring, the roller moves with the user and puts significant strain on the shoulder and wrist joints. In the alternative, the present invention utilizes the stationary base that allows the user to roll the length of the hamstring with minimal strain on the shoulders and wrists. The system and method of the present invention act as an all-inclusive, modular roller system which allows interchangeability of selected parts to provide access all the different muscle groups of differently sized persons in one compact, self-contained unit. The kit provides, in addition, shaft supporting and steering handles which can be used separately from the cradle member, thus allowing a selected array of roller members to be aligned upon and supported by the shaft member so that the handheld customized roller array can be used as a handheld device, adding to the customizability and usefulness of the product.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A therapeutic massage roller system, comprising:

a shaft extending from a first end to a second end, the shaft acting as an axle; and a plurality of wheels including:

a first set of wheels each having a first diameter, the first set of wheels including more than one wheel; and a second set of wheels each having a second diameter, the second set of wheels including more than one wheel;

wherein the second diameter is greater than the first diameter; and wherein each of the second set of wheels further comprises an opening through a center of said each of the second set of wheels, the opening configured to receive one of the first set of wheels such that said one of the first set wheels nests within the opening;

wherein said each of the second set of wheels further comprises a plurality of ridges extending into the opening and said one of the first set of wheels further comprises a plurality of channels extending along an outer surface, the plurality of channels corresponding to the plurality of ridges such that the plurality of channels engage with the plurality of ridges when said one of the first set of wheels nests within said opening;

wherein the shaft is configured to receive a user selection of the plurality of wheels such that a custom arrangement of wheels is arranged on the shaft; and wherein when said one of the second set of wheels is not nested within said opening, an outer surface of said one of the second set of wheels is configured to come into contact with the user's body during use.

2. The system of claim 1, further comprising:

a base extending from a first side end to a second side end and from a top end to a bottom end, the base having a first side support and a second side support;

wherein the first end of the shaft removably engages with the first side support and the second end of the shaft removably engages with the second side support such that the shaft and the plurality of wheels are held above the base during use of the therapeutic massage roller system.

3. The system of claim 2, further comprising:

a cover having a plurality of sections extending into the cover, each of the plurality of sections configured to receive two wheels, the two wheels including a first wheel from the first set of wheels and a second wheel from the second set of wheels, wherein the first wheel is positioned within a center of the second wheel such that a side face of the first wheel and a side face of the second wheel are level with one another; and the cover is configured to engage with the base to enclose the plurality of sections and the plurality of wheels when the therapeutic massage roller system is not in use.

4. The system of claim 1, further comprising:

a first mount and a second mount to secure the shaft and the user selection of the plurality of wheels to a vertical surface, each of the first mount and the second mount including a spring loaded plunger such that each of the first mount is configured to vertically adjust along a first rail and the second mount is configured to adjust along a second rail to adjust a height of the shaft and the user selection of the plurality of wheels.

5. The system of claim 4, wherein the first mount and the second mount are each quick release attachments to receive the shaft.

6. The system of claim 1, wherein said one of the second set of wheels requires said one of the first set of wheels to be nested therein to engage with the shaft.

7. The system of claim 1, wherein each of the second set of wheels requires one of the first set of wheels to be nested therein to engage with the shaft.

8. The system of claim 1, wherein the custom arrangement of wheels further comprises a first wheel from the first set of wheels and a second wheel from the second set of wheels, wherein an outer surface of the first wheel and an outer surface of the second wheel are both configured to come into contact with the user's body during use.

9. A therapeutic massage roller system, comprising:

a shaft extending from a first end to a second end, the shaft acting as an axle; and a plurality of wheels, including:

a first set of wheels including more than one wheel; and a second set of wheels including more than one wheel;

a cover having a plurality of sections extending into the cover, each of the plurality of sections configured to receive two wheels, the two wheels including a first wheel from the first set of wheels and a second wheel from the second set of wheels, wherein the first wheel is positioned within a center of the second wheel such that a side face of the first wheel and a side face of the second wheel are level with one another; and wherein each of the second set of wheels further comprises an opening, the opening configured to receive one of the first set of wheels such that said one of the first set wheels nests within the opening;

wherein said each of the second set of wheels further comprises a plurality of ridges extending into the opening and said one of the first set of wheels further comprises a plurality of channels extending along an outer surface, the plurality of channels corresponding to the plurality of ridges such that the plurality of channels engage with the plurality of ridges when said one of the first set of wheels nests within said opening;

wherein the cover is configured to engage with a base to enclose the plurality of sections and the plurality of wheels when the therapeutic massage roller system is not in use;

wherein the shaft is configured to receive a user selection of the plurality of wheels such that a custom arrangement of wheels is arranged on the shaft for use by the user; and wherein when said one of the second set of wheels is not nested within said opening, an outer surface of said one of the second set of wheels is configured to come into contact with the user's body during use.

10. The system of claim 9, wherein the base extends from a first side end to a second side end and from a top end to a bottom end, the base having a first side support and a second side support, wherein the first end of the shaft engages with the first side support and the second end of the shaft engages with the second side support such that the shaft and the user selection of the plurality of wheels are held above the base during use of the therapeutic massage roller system.

11. The system of claim 9, wherein each of the first set of wheels has a first diameter and each of the second set of wheels has a second diameter, the second diameter being greater than the first diameter.

12. The system of claim 9, wherein the custom arrangement of wheels further comprises a first wheel from the first set of wheels and a second wheel from the second set of wheels, wherein an outer surface of the first wheel and an outer surface of the second wheel are both configured to come into contact with the user's body during use.

13. A therapeutic massage roller system, comprising:

a shaft extending from a first end to a second end, the shaft acting as an axle; and a plurality of wheels, including:

a first set of wheels including more than one wheel; and a second set of wheels including more than one wheel;

a first wall mounted rail configured to secure vertically along a wall;

a second wall mounted rail configured to secure vertically along the wall;

a first mount configured to receive the first end of the shaft and slidingly engage with the first wall mounted rail; and a second mount configured to receive the second end of the shaft and slidingly engage with the second wall mounted rail;

wherein each of the second set of wheels further comprises an opening, the opening configured to receive one of the first set of wheels such that said one of the first set wheels nests within the opening;

wherein said each of the second set of wheels further comprises a plurality of ridges extending into the opening and said one of the first set of wheels further comprises a plurality of channels extending along an outer surface, the plurality of channels corresponding to the plurality of ridges such that the plurality of channels engage with the plurality of ridges when said one of the first set of wheels nests within said opening;

wherein the first mount and the second mount are configured to be vertically adjusted along the first and second wall mounted rails; and wherein the shaft is configured to receive a user selection of the plurality of wheels such that a custom arrangement of wheels is arranged on the shaft for use by the user.

14. The system of claim 13, wherein the first wall mount comprises a first quick release attachment configured to receive the first end of the shaft and the second wall mount comprises a second quick release attachment configured to receive the second end of the shaft.

15. The system of claim 13, wherein the first mount further comprises a spring loaded plunger configured to engage with the first wall mounted rail and configured to adjust a position of the first mount along the first wall mounted rail.

16. The system of claim 15, wherein the spring loaded plunger extends outward in a direction opposite from the shaft and is configured to selectively engage with one of a plurality of apertures extending into the first wall mounted rail.

* * * * *